United States Patent [19]
Djeu

[11] Patent Number: 6,045,259
[45] Date of Patent: Apr. 4, 2000

[54] FIBER-OPTIC HIGH TEMPERATURE SENSOR

[75] Inventor: Nicholas I. Djeu, Tampa, Fla.

[73] Assignee: University of South Florida, Tampa, Fla.

[21] Appl. No.: 08/943,654

[22] Filed: Oct. 3, 1997

Related U.S. Application Data

[60] Provisional application No. 60/027,621, Oct. 4, 1996.

[51] Int. Cl.$^7$ .................................................. G01K 11/00
[52] U.S. Cl. ................................ 374/161; 385/12; 385/35
[58] Field of Search .......................... 385/12, 35; 374/161

[56] References Cited

U.S. PATENT DOCUMENTS

| | | | |
|---|---|---|---|
| 3,865,564 | 2/1975 | Jaeger et al. | 65/2 |
| 3,906,221 | 9/1975 | Mercier | 385/12 |
| 3,939,035 | 2/1976 | Keller | 156/620 |
| 3,944,640 | 3/1976 | Haggerty et al. | 264/25 |
| 4,040,890 | 8/1977 | Burrus, Jr. et al. | 156/605 |
| 4,421,721 | 12/1983 | Byer et al. | 422/109 |
| 4,532,000 | 7/1985 | Harrington et al. | 156/620 |
| 4,537,653 | 8/1985 | Teraishi | 156/620 |

(List continued on next page.)

FOREIGN PATENT DOCUMENTS

| | | |
|---|---|---|
| WO89/12031 | 12/1989 | WIPO . |
| WO96/12834 | 5/1996 | WIPO . |

OTHER PUBLICATIONS

"Graded reflectance mirrors and phase–unifying mirrors for XeCl lasers", by Flori, et al., *Pure Appl. Opt.*, 3(1994) pp. 417–426.

"Low–loss single–crystal sapphire optical fibers", by Magel, et al., *SPIE*, vol. 513, Infrared Optical Materials and Fibers IV (1986) pp. 89–94.

"characterization of singular crystal sapphire fibers for optical power delivery systems", by Jundt, et al., *Appl. Phys. Lett.*, 55 (21), Nov. 20, 1989, pp. 2170–2172.

"A Novel Implementation of Laser Heated Pedestal Growth for the Rapid Drawing of Sapphire Fibers", Phomsakha, et al., University of South Florida.

"The use of fibre optic techniques for temperature measurement", by Grattan, *Measurement+Control*, vol. 20, Jul. 1987, pp. 32–39.

"Infrared fluorescence "decay–time" temperature sensor", by Grattan, et al., *Rev. Sci. Instrum.*, 56(9), Sep. 1985, pp. 1784–1787.

(List continued on next page.)

*Primary Examiner*—Randy W. Gibson
*Attorney, Agent, or Firm*—Calfee, Halter & Griswold, LLP

[57] ABSTRACT

A crystalline structure, comprising an optical waveguiding region, a crystalline fluorescent temperature sensing region, and a crystalline junction between the optical waveguiding region and the crystalline fluorescent temperature sensing region. An embodiment of the present invention is a novel fiber-optic temperature sensor functional under high-temperature conditions. The fiber-optic temperature sensor comprises a continuous crystalline fiber optic high temperature sensor probe having a crystalline optical waveguiding region with first and second ends, and a crystalline fluorescent temperature sensing tip at one end thereof. The crystalline optical waveguiding region and the crystalline fluorescent temperature sensing tip are preferably crystallographically and thermomechanically compatible with each other. The fluorescent temperature sensing tip contains fluorescent ions that can be excited to fluoresce and produce a fluorescence emission. The fiber optic high temperature sensor probe also contains a crystalline junction preferably having a continuous, crystalline structure throughout. The crystalline junction is located between, and attached to, the crystalline fluorescent temperature sensing tip and the first end of the crystalline optical waveguiding region such that, preferably, a continuous, crystalline fiber optic high temperature sensor probe is formed.

29 Claims, 1 Drawing Sheet

U.S. PATENT DOCUMENTS

| | | | |
|---|---|---|---|
| 4,542,987 | 9/1985 | Hirschfeld | 374/161 |
| 4,607,776 | 8/1986 | Nightingale et al. | 226/171 |
| 4,650,322 | 3/1987 | Fejer et al. | 356/73.1 |
| 4,673,299 | 6/1987 | Dakin | 374/161 |
| 4,707,217 | 11/1987 | Aklufi | 156/617 R |
| 4,981,549 | 1/1991 | Yamshita et al. | 156/620.4 |
| 4,997,286 | 3/1991 | Fehrenbach et al. | 374/161 |
| 5,037,181 | 8/1991 | Byer et al. | 385/144 |
| 5,077,087 | 12/1991 | Byer et al. | 427/163 |
| 5,235,605 | 8/1993 | Rines et al. | 372/20 |
| 5,260,964 | 11/1993 | Morin et al. | 372/95 |
| 5,264,189 | 11/1993 | Yamashita et al. | 422/249 |
| 5,283,692 | 2/1994 | Herbst | 359/580 |
| 5,361,313 | 11/1994 | O'Keefe | 385/12 |
| 5,607,506 | 3/1997 | Phomsakha et al. | 117/33 |
| 5,699,464 | 12/1997 | Marcuse et al. | 385/35 |
| 5,839,830 | 11/1998 | Young et al. | 374/161 |
| 5,870,511 | 2/1999 | Sawatari et al. | 385/12 |

OTHER PUBLICATIONS

"Fluorescent decay thermometer with biological applications", by Sholes, *Rev. Sci. Instrum.* 51(7), Jul. 1980, pp. 882–884.

"Remote Optical Measurement of Temperature Using Luminescent Materials", *Electronics Letters*, vol. 17, Sep. 2, 1981, pp. 630–631.

FIBER-OPTIC HIGH TEMPERATURE SENSOR

REFERENCE TO RELATED APPLICATIONS

This application claims the benefit of U.S. Provisional Application No. 60/027,621 filed Oct. 4, 1996.

FIELD OF INVENTION

This invention relates generally to a means of high-temperature sensing, and more particularly, a means of high-temperature sensing using a crystalline optical probe.

BACKGROUND OF INVENTION

In numerous industrial, aerospace, and research applications, there is a need to monitor the temperature of a particular process or component. For example, the knowledge of the temperature enables one to determine whether a particular process used in the application is functioning in an optimized manner. Knowledge of the temperature can also enable one to prevent the overheating of a component and any damage that may result, should the temperature exceed a maximum level at which the particular component can operate.

There has been a growing need for temperature sensors with very high temperature sensing capability. This need is especially evident in the development of gas turbines for both jet engine and power generation applications. Conventional temperature sensors such as thermocouples and pyrometers are not suitable for this purpose. As a result, a number of novel temperature sensors have been developed in recent years to meet this need.

One of these approaches is based on the temperature dependent fluorescence decay time found in certain materials. Fluorescence is a form of photoluminescence wherein a molecule, ion or atom at its lowest energy, or ground state, is promoted to a higher energy state, called an excited state, by absorbing radiant energy. The actual fluorescence emission is produced when the excited species undergoes a radiative transition from the excited state to a lower state, usually the ground state. The emitting state may be either directly excited through the absorption of a photon by a ground state specie or indirectly after subsequent cascade steps.

In fluorescence based temperature sensing, the most commonly found type of fluorescence decay has an exponential dependence on time according to the following relationship:

$$I(t)=I_o e^{-t/\tau}$$

wherein $I(t)$ is the intensity of the fluorescent radiation at time t after the termination of the exciting radiant energy (including cascade of energy transfer steps if present), $I_o$ is the intensity of the fluorescent radiation at t=0, and $\tau$ is the temperature dependent decay time of the fluorescent emission. With this equation, the temperature of the fluorescent species can be determined based on the decay time of its fluorescent emission.

The prior art discloses instruments which have attempted to utilize this relationship in order to measure temperature. For example, U.S. Pat. No. 4,542,987 (Hirschfeld) discloses a temperature-sensitive optrode wherein a fluorescent solid composed of solid state laser materials or glass, doped with rare earth metals, is attached to one end of a fiber optic with either a connector or cement. A light source is attached to the other end of the fiber optic. The fluorescent solid is then exposed to heat. Light from the light source propagates through the fiber optic to the fluorescent solid. When the light source is shut off, a fluorescent emission is given off which propagates through the fiber optic to a detector. An electronic processor then converts the decay time of the emission into a temperature.

This apparatus however has inherent limitations in its ability to measure high temperatures, i.e. greater than 500° C. In the preferred embodiment of the '987 patent where the patentee is explaining the use of ruby as the fluorescent source, he specifically states:

Although the response of ruby extends out to about 1000° C., the current practical limitation for operability is about 500° C. The limitation arises primarily from the lack of available high-temperature cements for the interface between the ruby optrode and the long-distance fiber. (Column 8, lines 50–55.)

U.S. Pat. No. 4,673,299 (Dakin) also discloses a fluorescence based temperature sensor using a fluorescent source coupled to a fiber optic, which in turn, is coupled to a light source and detector. However, like the '987 patent, a connector is used to attach the fluorescent source to the fiber optic. Hence, applicant believes the utility of the invention disclosed in this patent also suffers from the same limitation that afflicts the '987 patent, i.e., it cannot measure temperatures greater than the decomposition temperature of the coupling means (either cement or a mechanical connector) connecting the fluorescent source and the fiber optic.

In U.S. Pat. No. 4,997,286 (Fehrenbach, et al.), glass solder is used to connect a glassy optical waveguide to the fluorescent source. As a result, the glass solder is also subjected to very high temperatures. Applicant believes that high temperatures could degrade the glass solder as well as the glassy optical waveguide to which it is attached, and hence destroy the integrity of the device.

SUMMARY OF INVENTION

There is provided, in accordance with the present invention a crystalline structure, comprising an optical waveguiding region, a crystalline fluorescent temperature sensing region, and a crystalline junction between the optical waveguiding region and the crystalline fluorescent temperature sensing region. An embodiment of the present invention is a novel fiber-optic temperature sensor that applicant believes is fully functional under high-temperature conditions and does not possess the shortcomings of the prior art as explained above. The fiber-optic temperature sensor comprises a continuous crystalline fiber optic high temperature sensor probe having a crystalline optical waveguiding region with first and second ends, and a crystalline fluorescent temperature sensing tip at one end thereof. The crystalline optical waveguiding region and the crystalline fluorescent temperature sensing tip are preferably crystallographically and thermomechanically compatible with each other. The fluorescent temperature sensing tip contains fluorescent ions that can be excited to fluoresce and produce a fluorescence emission. The fiber optic high temperature sensor probe also contains a crystalline junction preferably having a continuous, crystalline structure throughout. The crystalline junction is located between, and attached to, the crystalline fluorescent temperature sensing tip and the first end of the crystalline optical waveguiding region such that, preferably, a continuous, crystalline fiber optic high temperature sensor probe is formed.

Additional system elements of the present invention include a source of electromagnetic radiation, and a first coupling means to couple the source of electromagnetic radiation to the second end of the crystalline optical waveguiding region of the crystalline fiber-optic high temperature sensor probe such that electromagnetic radiation emitted from the source of electromagnetic radiation propagates through the crystalline fiber-optic high temperature sensor probe to the crystalline fluorescent temperature sensing tip and excites the fluorescent ions contained in said crystalline fluorescent temperature sensing tip which produce a fluorescence emission when they radiatively decay.

The fluorescence emission produced then propagates from the crystalline fluorescent temperature sensing tip, through the crystalline fiber-optic high temperature sensor probe to a detector, wherein a second coupling means couples the detector to the second end of the crystalline optical waveguiding region of the crystalline fiber-optic high temperature sensor probe. This detector detects the fluorescence emission and produces an electrical signal related to, and preferably proportional to, the intensity of said fluorescence emission. A processor coupled to the detector converts the electrical signal produced by the detector into an electrical representation of temperature. A display, which displays the electrical representation of temperature, preferably in units of degrees, can be coupled to the processor.

The principal object of the present invention is to measure high temperatures greater than 500° C. Applicant believes such an object is readily achievable because this invention obviates the need for any connector means, cement or glass solder in the crystalline fiber-optic high temperature sensor probe between the crystalline optical waveguiding region and the crystalline fluorescence sensing tip. Instead, the present invention employs a crystalline junction between the crystalline optical waveguiding region and the crystalline fluorescent temperature sensing tip. Hence applicant believes the maximum temperature that the present invention can sense is limited only by the melting points of the materials which make up the crystalline fiber-optic high temperature sensor probe.

The crystalline junction described in the present invention has a crystalline lattice type structure which is formed from the integration of the crystal lattice of a portion of the crystalline optical waveguiding region with the crystal lattice of a portion of crystalline fluorescent temperature sensing tip. As a result, it has a graded composition, transitioning from the crystal that constitutes the crystalline optical waveguiding region to the crystal that constitutes the crystalline fluorescent temperature sensing tip. Most preferably, in order for the crystalline junction to form, the crystalline optical waveguiding region and the crystalline fluorescent temperature sensing tip are crystallographically and thermomechanically compatible. For purposes of this application, "crystallographically compatible" means that the crystal lattices of the crystalline optical waveguiding region and the crystalline fluorescent temperature sensing tip are similar enough in structure such that their integration will promote cross bonding between the crystal lattices and form the crystalline junction. For example, crystal lattices which match one another in terms of the number, arrangement and spacing of atoms in their bonding planes typically form strong bonds and a crystal lattice type structure which is continuous from one crystal lattice to the other. Moreover, if the crystal lattices "register" with one another so that they have the same arrangement of atoms but the atomic spaces are in multiples or rational fractions of one another, they will also form a continuous crystal lattice structure upon integration, and hence are crystallographically compatible.

For purposes of this application, "thermomechanically similar" means that the coefficients of thermal expansion of the crystalline optical waveguiding region and the crystalline fluorescent temperature sensing tip are sufficiently close to each other that repeated expansion and contraction of the two regions during the anticipated use of the present invention will not compromise the integrity of the crystalline junction.

DETAILED DESCRIPTION OF THE PREFERRED EMBODIMENTS

Figure 1:
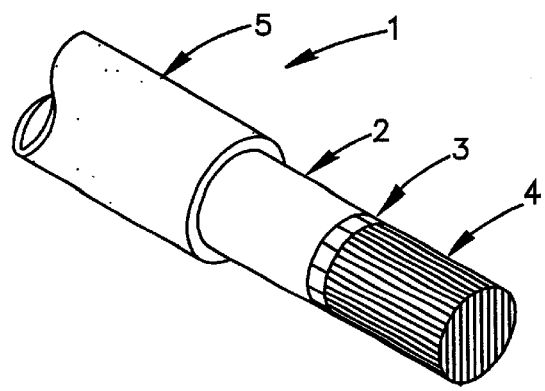
FIG. 1 is a schematic illustration of an end portion of a crystalline probe according to the present invention.

FIG. 1 is a schematic illustration of the end portion of a crystalline fiber-optic high temperature sensor probe (1) according to the present invention, which comprises the crystalline optical waveguiding region (2), the crystalline junction (3) and the crystalline fluorescent temperature sensing tip (4). It is jacketed by high-temperature capable tubing (5), which provides additional mechanical support. For high temperature applications, oxide crystals for both the optical waveguiding region and the temperature sensing tip are preferred because of their high melting points. To achieve crystallographic and thermomechanical compatibility, the crystalline optical waveguiding region (2) and the crystalline fluorescent temperature sensing tip (4) can be made from undoped and doped materials, respectively, of the same crystal. For example, the crystalline optical waveguiding region (2) can be made from $Y_3Al_5O_{12}$ (YAG) and the crystalline fluorescent temperature sensing tip (4) can be made from Er doped YAG. Alternatively, the crystalline optical waveguiding region and the crystalline fluorescent temperature sensing tip can be made from different crystal oxides. For example, the crystalline optical waveguiding region (2) can be made from $Y_2O_3$ and the crystalline fluorescent temperature sensing tip (4) can be made from $Er_2O_3$.

In the case that the waveguiding region (2) and the temperature sensing tip (4) are made from undoped and doped materials of the same crystal, the temperature sensing tip (4) may also be multiply doped. One or more types of ions may be introduced into the temperature sensing tip (4) in addition to the ions responsible for the fluorescence. These additional ions facilitate the excitation of the fluorescent state. For example, temperature sensing tip (4) may be co-doped with Er and Cr. The latter can absorb broad-band visible radiation more efficiently, and then transfer the electronic energy to Er. Also, one or more types of ions may be introduced into the temperature sensing tip (4) in addition to the ion responsible to fluorescence to produce a more pronounced temperature dependence of the lifetime of the fluorescent state. For example, if Yb is used as the fluorescent ion, one may co-dope the temperature sensing tip (4) with Eu or Tb, which by acting as acceptors can reduce the energy that must be dissipated non-radiatively by the Yb ions.

When the waveguiding region (2) and the temperature sensing tip (4) are made from two different types of crystals, the host ion in the temperature sensing tip (4) (such as Er in $Er_2O_3$) can itself serve as the fluorescent species. Even in this case however, one may want to dope one or more ions into the sensing tip (4) to facilitate the excitation or depopulation of the fluorescent state.

As shown in FIG. 1, the crystalline junction (3) lies between the crystalline optical waveguiding region (2) and the crystalline fluorescent temperature sensing tip (4). In applicant's opinion the integration of a portion of crystalline optical waveguiding region (2) with a portion of the crystalline fluorescent temperature sensing tip (4) to form the crystalline junction (3) can be accomplished in two different means. One such means is to grow them separately using, for example, the Laser Heated Pedestal Growth (LHPG) Technique. An example of such an LHPG system is disclosed in commonly owned U.S. Pat. No. 5,607,506, which is incorporated herein by reference. Once the crystalline optical waveguiding region (2) and the crystalline fluorescent temperature sensing tip (4) have been separately fabricated with the same axial crystalline orientation, they can be aligned azimuthally and fused together, for example, by using the focused radiation from a laser. By way of further example, suitable radiation to fuse the separately fabricated crystalline optical waveguiding region (2) and the crystalline fluorescent temperature sensing tip (4) can be provided by a laser in a manner similar in some respects to the LHPG technique.

Another means involves growing either the crystalline optical waveguiding region (2) or the crystalline fluorescent temperature sensing tip (4) from the other. For example, one can utilize the LHPG technique using either the crystalline optical waveguiding region (2) or the crystalline fluorescent temperature sensing tip (4) as the "solid feed material" in the LHPG technique and using the remaining part as the "seed fiber." Integration of the crystal lattices of a portion of crystalline optical waveguiding region (2) and crystalline fluorescent temperature sensing tip (4) can occur at the contact point of the "seed fiber" and the "molten feed material," and forms the crystalline junction (3). Regardless of the means used, applicant believes that most preferably a continuous crystalline structure should result throughout the crystalline junction (3) provided that crystallographically compatible materials are used for the crystalline optical waveguiding region (2) and the crystalline fluorescent temperature sensing tip (4).

Figure 2:
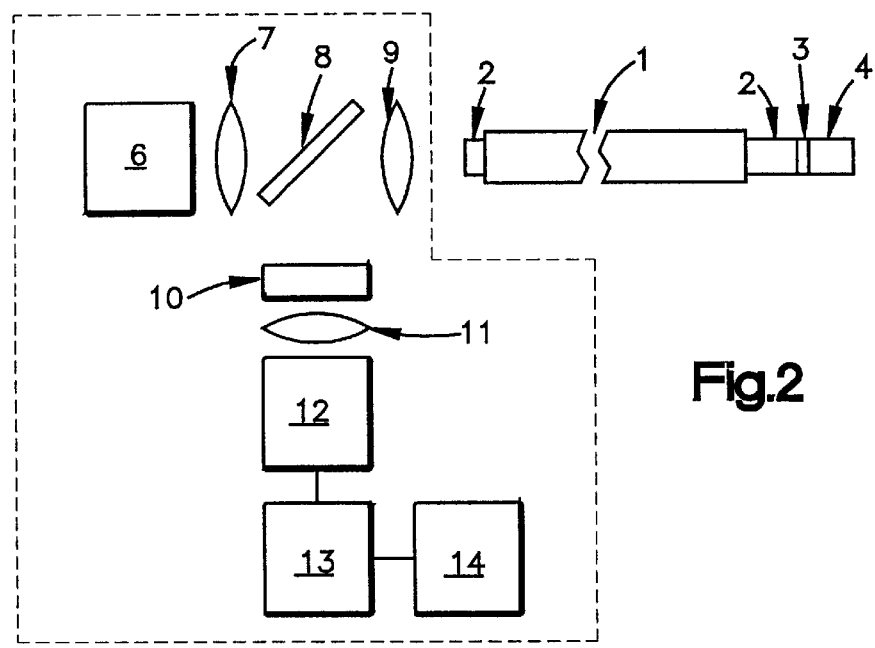
FIG. 2 is a schematic illustration of a first system embodiment of the present invention.

FIG. 2. is a schematic illustration of one embodiment of a system according to the present invention. Electromagnetic radiation is generated by a source of electromagnetic radiation, such as an optical excitation means (6). The first coupling means then involves a first lens (7) which focuses the electromagnetic radiation onto dichroic element (8), which has a high transmissivity at the excitation wavelength. A second lens (9) then focuses the electromagnetic radiation that passes through dichroic element (8) onto the tip of crystalline optical waveguiding region of the crystalline fiber-optic high temperature sensor probe (1).

After passing through the first coupling means, the electromagnetic radiation propagates through the crystalline optical waveguiding region (2) to crystalline fluorescent temperature sensing tip (4), where it excites fluorescent ions contained in the crystalline temperature sensing tip (4). When the excited fluorescent ions decay radiatively, a fluorescence emission is produced which propagates through the crystalline fiber-optic high temperature sensor probe (1) in a direction opposite to that in which the excitation light traveled, i.e., it travels through crystalline junction (3) and crystalline optical waveguiding region (2) towards the end of the crystalline fiber-optic high temperature sensor probe (1) opposite the end of the crystalline optical waveguiding region, where the fluorescence emission is emitted.

The second coupling means in this embodiment comprises second lens (9), dichroic element (8), a filter (10), and a third lens (11). In particular, the fluorescence emission emitted is focused by second lens (9) onto dichroic element (8). The fluorescence emission is reflected off dichroic element (8) and passes through filter (10), which rejects electromagnetic radiation from optical excitation means (6). The third lens (1 1) then collects the fluorescence emission that passes through filter (10), and focuses it onto a detector (12).

Detector (12) then produces an electrical signal related to, and preferably proportional to, the intensity of the detected fluorescence emission. This electrical signal is routed to an electronic processor (13) coupled to the detector, which analyzes the electrical signal and determines from it a parameter related to the temperature of the crystalline fluorescent temperature sensing tip (4). This information is then displayed by a digital readout (14) that is interfaced with the electronic processor (13).

The optical excitation means (6) is preferably a light emitting diode (LED) or a laser. Its output can be either in the form of pulses or sinusoidally modulated light beam. If a pulsed light source is used, the resulting fluorescence emission will also be in the form of pulses. Provided that the turn-off time of light source (6) is much shorter than the decay time of the fluorescent ions contained in the crystalline fluorescent temperature sensing tip (4), the decay time of the fluorescence emission directly gives the temperature of the crystalline fluorescent temperature sensing tip (4). When the sinusoidal modulation mode is used, the fluorescence emission will also take the form of a sinusoidal wave. In this case, the decay time of the fluorescent ions contained in the crystalline fluorescent temperature sensing tip (4) manifests itself as a phase shift of the sinusoidal fluorescence emission relative to the sinusoidal output of light source (6).

In the embodiment schematically illustrated in FIG. 2, one can insert a suitable optical fiber between crystalline fiber optic high temperature sensor probe (1) and second lens (9). This fiber allows the placement of all components inside the dashed box at a remote location. In this case, the end of the crystalline probe where the crystalline optical waveguiding region (2) is located can be fitted with a standard fiber optic coupler. This would facilitate the mating of the crystalline fiber optic high temperature sensor probe (1) to the optical fiber.

Figure 3:
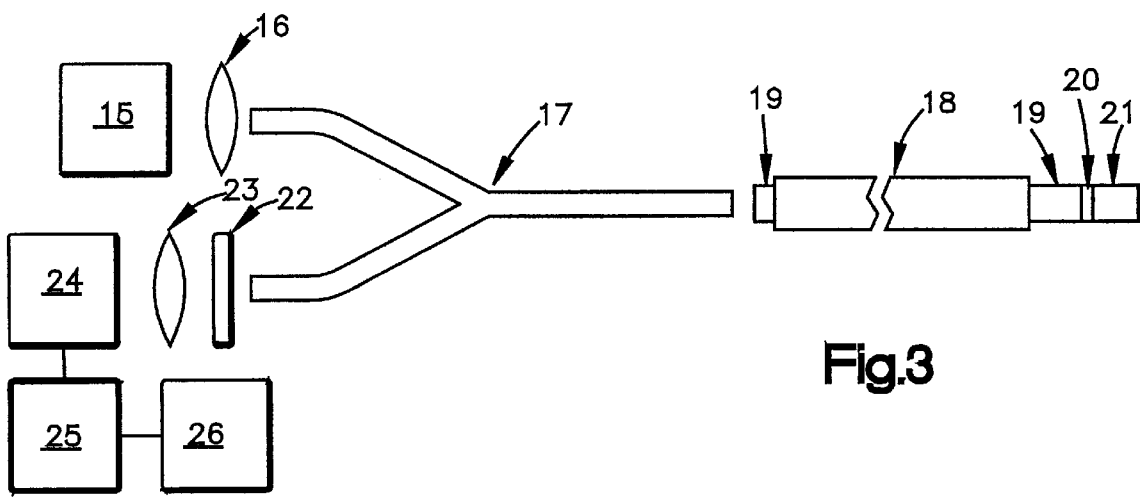
FIG. 3 is a schematic illustration of a second system embodiment of the present invention.

FIG. 3 is a schematic illustration of a second system embodiment of the present invention. In this embodiment, the first and second coupling means are integrated with a bifurcated optical fiber (17) having a first end attached to the end of the crystalline optical waveguiding region (19), and a second end having first and second arms, each arm having an end.

Initially, electromagnetic radiation from an optical excitation means (15) is produced. A first lens (16) then focuses this electromagnetic radiation into the end of the first arm of bifurcated optical fiber (17). The electromagnetic radiation then propagates through bifurcated optical fiber (17) and fiber optic high temperature sensor probe (18) attached thereto, to the crystalline fluorescent temperature sensing tip (21).

At the crystalline fluorescent temperature sensing tip (21), the electromagnetic radiation excites fluorescent ions contained therein. When the excited fluorescent ions decay radiatively, a fluorescence emission is produced which propagates through the crystalline fiber-optic high temperature sensor probe (18) in a direction opposite to that in which the excitation electromagnetic radiation propagated, i.e. through crystalline junction (20) and crystalline optical waveguiding region (19) towards the end of the crystalline fiber-optic high temperature sensor probe (18) opposite the end containing the crystalline fluorescent temperature sensing tip (21). Part of this fluorescence emission will enter a second arm of bifurcated optical fiber (17).

The second coupling means in this embodiment is composed of the second arm of bifurcated optical fiber 17, a filter (22) located adjacent to the end of said second arm, which permits the fluorescence emission to pass, but blocks electromagnetic radiation from optical excitation means (15), and a second lens (23), which collects and focuses the fluorescence emission that travels through filter (22) onto detector (24). Detector (24) then generates an electrical signal related to, and preferably proportional to, the intensity of the fluorescence emission. This electrical signal is then routed to an electronic processor (25), which analyzes it and determines from it the temperature of the crystalline fluorescent temperature sensing tip (21). This information is then displayed by a digital readout (26) that is interfaced with the electronic processor (25).

Many other variations and modifications of the present invention will be apparent to those skilled in the art without departing from the spirit and scope of the invention. The above described embodiments are, therefore, intended to be merely exemplary, and all such variations and modifications are intended to be included within the scope of the invention as defined in the appended claims.

What is claimed is:

1. A crystalline structure, comprising:
   (a) a crystalline optical waveguiding region;
   (b) a crystalline fluorescent temperature sensing region; and
   (c) a crystalline junction between said optical waveguiding region and said crystalline fluorescent temperature sensing region.

2. A crystalline structure according to claim 1, wherein said optical waveguiding region comprises a crystal of a first oxide material, and said crystalline fluorescent temperature sensing region comprises a crystal of said first oxide material doped with at least one type of ion that can be excited to produce a fluorescence emission.

3. A crystalline structure according to claim 2, wherein said first oxide material comprises $Y_3Al_5O_{12}$ and said first oxide material doped with at least one type of ion comprises $Y_3Al_5O_{12}$ doped with Er.

4. A crystalline structure according to claim 1, wherein said optical waveguiding region comprises $Y_3Al_5O_{12}$ and said crystalline fluorescent temperature sensing region comprises $Y_3Al_5O_{12}$ doped with Er.

5. A crystalline structure according to claim 1, wherein said optical waveguiding region comprises a first crystal of a first oxide material and said crystalline fluorescent temperature sensing region comprises a second crystal of a second oxide material.

6. A crystalline structure according to claim 5, wherein said first oxide material comprises $Y_2O_3$ and said second oxide material comprises $Er_2O_3$.

7. A crystalline structure according to claim 1, wherein said optical waveguiding region comprises $Y_2O_3$ and said crystalline fluorescent temperature sensing region comprises $Er_2O_3$.

8. A crystalline structure according to claim 5, wherein said second oxide material is doped with at least one type of ion that can be excited to produce a fluorescence emission.

9. A crystalline structure according to claim 1, wherein said crystalline fluorescent temperature sensing region and said optical waveguiding region are crystallographically and thermomechanically compatible with each other at said crystalline junction.

10. A crystalline structure according to claim 2, wherein said crystalline fluorescent temperature sensing region and said optical waveguiding region are crystallographically and thermomechanically compatible with each other at said crystalline junction.

11. A crystalline structure according to claim 8, wherein said crystalline fluorescent temperature sensing region and said optical waveguiding region are crystallographically and thermomechanically compatible with each other at said crystalline junction.

12. A crystalline structure according to claim 1, wherein said crystalline junction has a continuous crystalline structure throughout.

13. A crystalline structure according to claim 1, wherein said crystalline structure has a continuous crystalline structure throughout.

14. A high temperature measurement system, comprising:
   (a) a crystalline fiber-optic high temperature sensor probe comprising a crystalline optical waveguiding region having a first end and a second end, a crystalline fluorescent temperature sensing tip connected to said crystalline optical waveguiding region at said first end by a crystalline junction, said crystalline fluorescent temperature sensing tip containing ions which can be excited to fluoresce and produce a fluorescence emission, and said crystalline optical waveguiding region and said crystalline fluorescent temperature sensing tip being crystallographically and thermomechanically compatible with each other;
   (b) a source of electromagnetic radiation for producing electromagnetic radiation that excites said ions to fluoresce and produce the fluorescence emission;
   (c) a first coupling means for optically coupling said source of electromagnetic radiation to said second tip of said crystalline optical waveguiding region such that electromagnetic radiation emitted from said source of electromagnetic radiation propagates through said crystalline fiber-optic high temperature sensor probe to said crystalline fluorescent temperature sensing tip, and excites fluorescent ions to produce said fluorescence emission, which fluorescence emission propagates through said crystalline fiber-optic high temperature sensor probe to said second end of said crystalline optical waveguiding region;
   (d) a second coupling means for optically coupling a detector to said second end of said crystalline optical waveguiding region, said detector detecting the fluorescence emission and producing an electrical signal related to the intensity of said fluorescence emission;
   (e) a processor coupled to said detector means for converting the electrical signal produced by said detector into an electrical representation of temperature; and
   (f) a display coupled to said processor to display the electrical representation of temperature.

15. A high temperature measurement system according to claim 14, wherein said crystalline optical waveguiding region comprises $Y_3Al_5O_2$ and said crystalline fluorescent temperature sensing tip comprises $Y_3Al_5O_{12}$ doped with Er.

16. A high temperature measurement system according to claim 14, wherein said crystalline optical waveguiding region comprises $Y_2O_3$ and said crystalline fluorescent temperature sensing tip comprises $Er_2O_3$.

17. A high temperature measurement system according to claim 14, wherein said source of electromagnetic radiation is a light emitting source from the group consisting of a light emitting diode (LED) and a laser.

18. A high temperature measurement system according to claim 14, wherein said first coupling means comprises:
   (a) a first lens which collimates the electromagnetic radiation produced by said source of electromagnetic radiation and focuses the electromagnetic radiation on a dichroic element having a high transmissivity at a wavelength which excites fluorescent ions contained in said crystalline fluorescent temperature sensing tip; and
   (b) a second lens which focuses electromagnetic radiation that is transmitted through said dichroic element onto said second end of said crystalline optical waveguiding region of said crystalline fiber optic high temperature sensor probe.

19. A high temperature measurement system according to claim 18, wherein said second coupling means comprises:
   (a) said second lens which collects said fluorescence emission emitted at said second end of said crystalline waveguiding region, and focuses said fluorescence emission onto said dichroic element;
   (b) a filter through which passes said fluorescence emission reflected from said dichroic element, said filter being able to reject electromagnetic radiation produced by said optical excitation means; and
   (c) a third lens which collects electromagnetic radiation that passes through said filter, and focuses said electromagnetic radiation onto said detector.

20. A high temperature measurement system according to claim 14, wherein said first and second coupling means comprise:
   (a) a bifurcated optical fiber having a first fiber end optically coupled to said crystalline optical waveguiding region of said fiber optic high temperature sensor probe, and a second fiber end having first and second arms, each of said arms having an end;
   (b) a first lens which focuses said electromagnetic radiation from said source of electromagnetic radiation into said end of said first arm such that said electromagnetic radiation propagates through said fiber optic high temperature sensor probe to said crystalline fluorescent temperature sensing tip;
   (c) a filter optically coupled to said end of said second arm, said filter permitting said fluorescence emission emitted from said end of said second arm to pass through and blocking said electromagnetic radiation from said optical excitation means; and
   (d) a second lens optically coupled to said end of said second arm via said filter, said second lens focusing said fluorescence emission that passes through said filter onto said detector.

21. A high temperature sensing device comprising:
   a temperature sensing tip formed from a first crystalline material capable of generating fluorescent radiation in response to excitation by incident radiation,
   an optical wave guide formed from a second crystalline material for transmitting incident radiation to the temperature sensing tip and also for transmitting fluorescent radiation away from the temperature sensing tip, the second crystalline material being different from but crystallographically and thermomechanically compatible with the first crystalline material, and
   a crystalline junction joining the temperature sensing tip and the optical wave guide together.

22. The device of claim 21, wherein the first and second crystalline materials have respective crystal lattices which register with one another.

23. The device of claim 22, wherein portions of the first and second crystalline materials integrate to form a continuous crystal lattice in the crystalline junction.

24. The device of claim 21, wherein the first and second crystalline materials have respective crystal lattices which match one another in terms of the number, arrangement and spacing of atoms in their bonding planes.

25. The device of claim 24, wherein portions of the first and second crystalline materials integrate to form a continuous crystal lattice in the crystalline junction.

26. The device of claim 21, wherein the first and second crystalline materials are formed from the same crystal, and wherein the first crystalline material is doped to facilitate fluorescence thereof.

27. The device of claim 26, wherein portions of the first and second crystalline materials integrate to form a continuous crystal lattice in the crystalline junction.

28. The device of claim 21, wherein the fluorescence decay exhibited by the first crystalline material has an exponential dependence on time according to the following equation:

$$I(t) = I_0 e^{-t/\tau}$$

where
   t=time,
   $I_0$ is the intensity of the fluorescent radiation at time t=0, and
   $\tau$ is the temperature dependent decay time of the fluorescent emission.

29. The device of claim 21, further comprising an optical fiber optically connected to the crystalline wave guide for transmitting radiant energy to and from a location remote from the temperature sensing tip.

* * * * *